(12) United States Patent
Huang

(10) Patent No.: US 8,733,941 B2
(45) Date of Patent: May 27, 2014

(54) LIGHT SOURCE SYSTEM WITH HIGH LUMINANCE AND MINIATURIZED PROFILE AND PROJECTION APPARATUS USING THE SAME

(75) Inventor: June-Jei Huang, Taoyuan Hsien (TW)

(73) Assignee: Delta Electronics, Inc. (TW)

( * ) Notice: Subject to any disclaimer, the term of this patent is extended or adjusted under 35 U.S.C. 154(b) by 211 days.

(21) Appl. No.: 13/093,987

(22) Filed: Apr. 26, 2011

(65) Prior Publication Data

US 2011/0279782 A1  Nov. 17, 2011

(30) Foreign Application Priority Data

May 14, 2010 (TW) .............................. 99115452 A

(51) Int. Cl.
*G03B 21/00* (2006.01)
(52) U.S. Cl.
USPC ............................................................ 353/31
(58) Field of Classification Search
USPC ........ 353/94, 31; 362/84, 291, 293, 555, 560, 362/583
See application file for complete search history.

(56) References Cited

U.S. PATENT DOCUMENTS

2005/0270775 A1* 12/2005 Harbers et al. ................ 362/231
2006/0227302 A1* 10/2006 Harbers et al. ................. 353/94
2009/0262309 A1* 10/2009 Yamauchi ....................... 353/37

FOREIGN PATENT DOCUMENTS

CN        2583700 Y     10/2003
CN      101373319 A      2/2009

OTHER PUBLICATIONS

Chinese Office Action for Application No. 201010192743.5, dated Jun. 20, 2012 with English Translation.
Taiwanese Office Action for Application No. 1022142913001, dated Oct. 22, 2013, with English translation.

* cited by examiner

*Primary Examiner* — Thanh Luu
*Assistant Examiner* — Danell L Owens
(74) *Attorney, Agent, or Firm* — Cantor Colburn LLP

(57) ABSTRACT

A light source system and a projection apparatus using the same are provided. The light source system comprises a light guide module, a light emitting module and a wavelength conversion element. The light guide module has a first side and a second side. The light emitting module is configured to generate a first light, a second light, a third light and a fourth light. The wavelength conversion element, disposed beside the second side of the light guide module, is configured to receive the second light and the fourth light, and to generate a fifth light according to the second light and the fourth light. The second light and the fourth light are guided to the wavelength conversion element via the light guide module. The first light, the third light and the fifth light are guided to the first side via the light guide module.

13 Claims, 2 Drawing Sheets

LIGHT SOURCE SYSTEM WITH HIGH LUMINANCE AND MINIATURIZED PROFILE AND PROJECTION APPARATUS USING THE SAME

This application claims priority to Taiwan Patent Application No. 099115452 filed on May 14, 2010, which is hereby incorporated by reference in its entirety.

CROSS-REFERENCES TO RELATED APPLICATIONS

Not applicable.

BACKGROUND OF THE INVENTION

1. Field of the Invention

The present invention relates to a light source system and a projection apparatus using the light source system. More particularly, the present invention relates to a light source system featuring both high luminance and a miniaturized profile and a projection apparatus using the light source system.

2. Descriptions of the Related Art

In recent years, owing to such advantages of light emitting diodes (LEDs) as a long service life, a low operating temperature and the capability of being instantaneously switched on and off, they have gradually replaced ultra high pressure (UHP) mercury bulbs as light sources of projection apparatuses.

However, light being emitted from the LEDs is divergent light. Therefore, when an LED is used as a light source in a projection apparatus, the image of the projection apparatus will have too low luminance as the light from the LED is insufficiently concentrated. Moreover, if a color wheel is further used as a dichroic device in the projection apparatus in which an LED is used as a light source, then the light from the LED will further decrease in the luminance of the image of the projection apparatus. Because the luminance of the image of the projection apparatus is directly affected by the light source of the projection apparatus, projection apparatus manufactures have proposed many methods for improving the luminance of the image of the projection apparatus.

One common method is to use a plurality of condensing lenses to concentrate light emitted from a light source of a projection apparatus so that the divergent light can be concentrated by the condensing lenses to improve the luminance of the image of the projection apparatus. However, concentrating the light from the light source in this way causes loss of the light energy when the light passes through the condensing lenses. Furthermore, arrangement of too many lenses also leads to a significantly increased volume of the projection apparatus.

Another common method is to directly use multiple LEDs of the red color, the blue color or the green color as light sources in order to improve the overall luminance by increasing the number of light sources. However, LEDs for generating the green light have a lower light emitting efficiency than the other two kinds of LED light sources (i.e., the red LEDs and the blue LEDs) due to limitations in the manufacturing process thereof. Therefore, when the three kinds of LEDs (i.e., red LEDs, blue LEDs and green LEDs) are used at the same time, a particular attention must be paid to arrangement thereof to avoid the problem of color non-uniformity of the image due to different intensities of the light sources of different colors. Furthermore, if too many light sources are arranged in the projection apparatus, waste of energy and difficulty in heat dissipation will be caused.

Accordingly, an urgent need exists in the art to provide a projection apparatus which has an efficient light source system and a small volume and, meanwhile, can reduce waste of energy and avoid the problem of color non-uniformity of the image.

SUMMARY OF THE INVENTION

The primary objective of the present invention is to provide a projection apparatus, which comprises an imaging system and a light source system. The light source system comprises a light guide module, a light emitting module and a wavelength conversion element. The light guide module has a first side and a second side. The light emitting module is adapted to generate a first light, a second light, a third light and a fourth light. The wavelength conversion element, which is disposed beside the second side of the light guide module, is adapted to receive the second light and the fourth light and generate a fifth light according to the second light and the fourth light. The second light and the fourth light are guided to the wavelength conversion element via the light guide module; and the first light, the third light and the fifth light are guided to the first side via the light guide module.

As described above, by making an optimized use of the light source, the light source system of the present invention can improve the luminance of the image of the projection apparatus using the light source system of the present invention and avoid the problem of color non-uniformity. Meanwhile, the projection apparatus using the light source system of the present invention can also eliminate such problems as excessive consumption of energy or the increased volume of the projection apparatus caused by a too complex arrangement of light source components.

The detailed technology and preferred embodiments implemented for the subject invention are described in the following paragraphs accompanying the appended drawings for people skilled in this field to well appreciate the features of the claimed invention.

DESCRIPTION OF THE PREFERRED EMBODIMENT

Hereinbelow, the present invention will be explained with reference to embodiments thereof. The present invention relates to a light source system and a projection apparatus using the light source system. The projection apparatus may be an apparatus with image projecting and displaying functions, for example, a digital light processing (DLP) projection display or a liquid crystal display (LCD) projection display. It shall be appreciated that, in the following embodiments and the attached drawings, description of these embodiments is only for purpose of illustration rather than to limit the present invention; furthermore, elements not directly related to the present invention are omitted from depiction, and dimensional relationships among individual elements in the attached drawings are illustrated only for ease of understanding but not to limit the actual scale.

Figure 1:
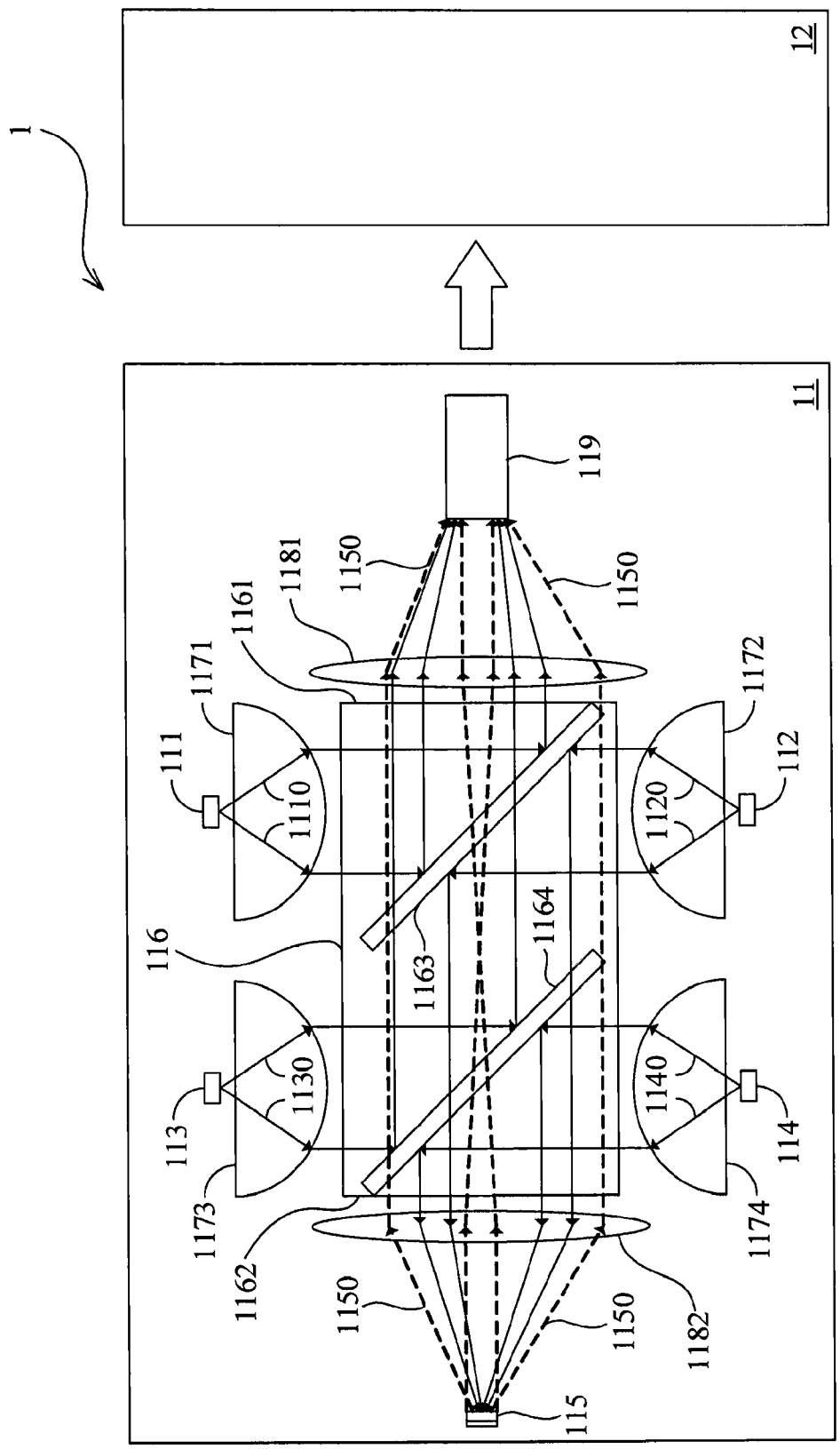
FIG. 1 is a schematic view of a projection apparatus of a first embodiment of the present invention.

As shown in FIG. 1, a first embodiment of the present invention is a projection apparatus 1, which comprises a light source system 11 and an imaging system 12. The light source system 11 of the projection apparatus 1 is adapted to generate light and output the light to the imaging system 12 so that the imaging system 12 displays an image on the screen.

The light source system 11 comprises a light emitting module consisting of a plurality of light sources 111, 112, 113, 114, a wavelength conversion element 115, a light guide module 116, a plurality of first lenses 1171, 1172, 1173, 1174, a plurality of second lenses 1181, 1182, and a light homogenizer module 119. For purpose of simplicity, the light sources 111, 112, 113, 114 will be referred to as first light source 111, second light source 112, third light source 113 and fourth light source 114 respectively. The light guide module 116 has a first side 1161 and a second side 1162, and comprises a first dichroic element 1163 and a second dichroic element 1164.

In this embodiment, the first light source 111 and the second light source 112, each being a blue light emitting diode (LED), are adapted to generate a first light 1110 of blue color and a second light 1120 of blue color respectively; the third light source 113, being a red LED, is adapted to generate a third light 1130 of red color; and the fourth light source 114, being an ultraviolet (UV) LED, is adapted to generate a fourth light 1140 which is UV light. The first dichroic element 1163 and the second dichroic element 1164 are arranged in series. The wavelength conversion element 115 has a conversion substance of a green phosphor and is disposed thereon. The light homogenizer module 119 may be either an integrating rod or a lens array assembly.

It shall be particularly noted herein that, the light homogenizer module 119 and the imaging system 12 are substantially disposed beside the first side 1161 of the light guide module 116, and the wavelength conversion element 115 is substantially disposed beside the second side 1162 of the light guide module 116. However, the light homogenizer module 119 of the present invention is not limited to an integrating rod or a lens array assembly. Those of ordinary skill in the art may also employ any other element with a light homogenizing function after the light source to output the emitted light. and thus no further description will be made thereon.

Further, in this embodiment, the first dichroic element 1163 is adapted to reflect blue light, and the second dichroic element 1164 is adapted to reflect UV light and red light. Accordingly, upon being concentrated to the first dichroic element 1163 via the first lens 1171, the first light 1110 which is the blue light will be reflected to the first side 1161 of the light guide module 116 directly and concentrated to the light homogenizer module 119 via the second lens 1181 so as to be projected to the imaging system 12.

Similarly, upon being concentrated to the second dichroic element 1164 via the first lens 1173, the third light 1130 which is the red light will be reflected to the first side 1161 of the light guide module 116 directly and concentrated to the light homogenizer module 119 via the second lens 1181 so as to be projected to the imaging system 12. It shall be particularly noted herein that, in the process of being reflected to the first side 1161 of the light guide module 116, the third light 1130 which is the red light passes through the first dichroic element 1163; however, the first dichroic element 1163 is adapted to reflect the blue light but transmit the red light. Therefore, the third light 1130 which is the red light can pass through the first dichroic element 1163 directly and be concentrated to the light homogenizer module 119 via the second lens 1181.

In a principle similar as described above, upon being concentrated to the first dichroic element 1163 via the first lens 1172, the second light 1120 which is the blue light will be reflected to the second side 1162 of the light guide module 116 directly and concentrated to the wavelength conversion element 115 via the second lens 1182. It shall be particularly noted herein that, in the process of being reflected to the second side 1162 of the light guide module 116, the second light 1120 of the blue light will pass through the second dichroic element 1164; however, the second dichroic element 1164 is adapted to reflect the UV light and the red light but transmit the blue light. Therefore, the second light 1120 of the blue light can pass through the second dichroic element 1164 directly and be concentrated to the wavelength conversion element 115 via the second lens 1182.

Similarly, upon being concentrated to the second dichroic element 1164 via the first lens 1174, the fourth light 1140 which is the UV light will be reflected to the second side 1162 of the light guide module 116 directly and concentrated to the wavelength conversion element 115 via the second lens 1182.

Upon receiving the second light 1120 of the blue light and the fourth light 1140 of the UV light, the wavelength conversion element 115 will convert the second light 1120 and the fourth light 1140 into the fifth light 1150 of the green light through the conversion substance.

Then, the fifth light 1150 of the green light, generated by the wavelength conversion element 115, will be concentrated to the light homogenizer module 119 via the second lenses 1181, 1182 and the light guide module 116. It shall be particularly noted herein that, in the process of being concentrated to the light homogenizer module 119 via the light guide module 116, the fifth light 1150 of the green light will pass through the first dichroic element 1163 and the second dichroic element 1164; however, the first dichroic element 1163 is adapted to reflect the blue light but transmit the green light, and the second dichroic element 1164 is adapted to reflect the UV light and the red light but transmit the green light either. Therefore, the fifth light 1150 of the green light can directly pass through the second dichroic element 1164 and the first dichroic element 1163 in a direction towards the first side 1161 of the light guide module 116, and then be concentrated to the light homogenizer module 119 via the second lens 1181.

Finally, the light homogenizer module 119 outputs to the imaging system 12 the first light 1110 which is the blue light, the third light 1130 which is the red light and the fifth light 1150 which is the green light so that the imaging system 12 displays an image with the first light 1110, the third light 1130 and the fifth light 1150.

Figure 2:
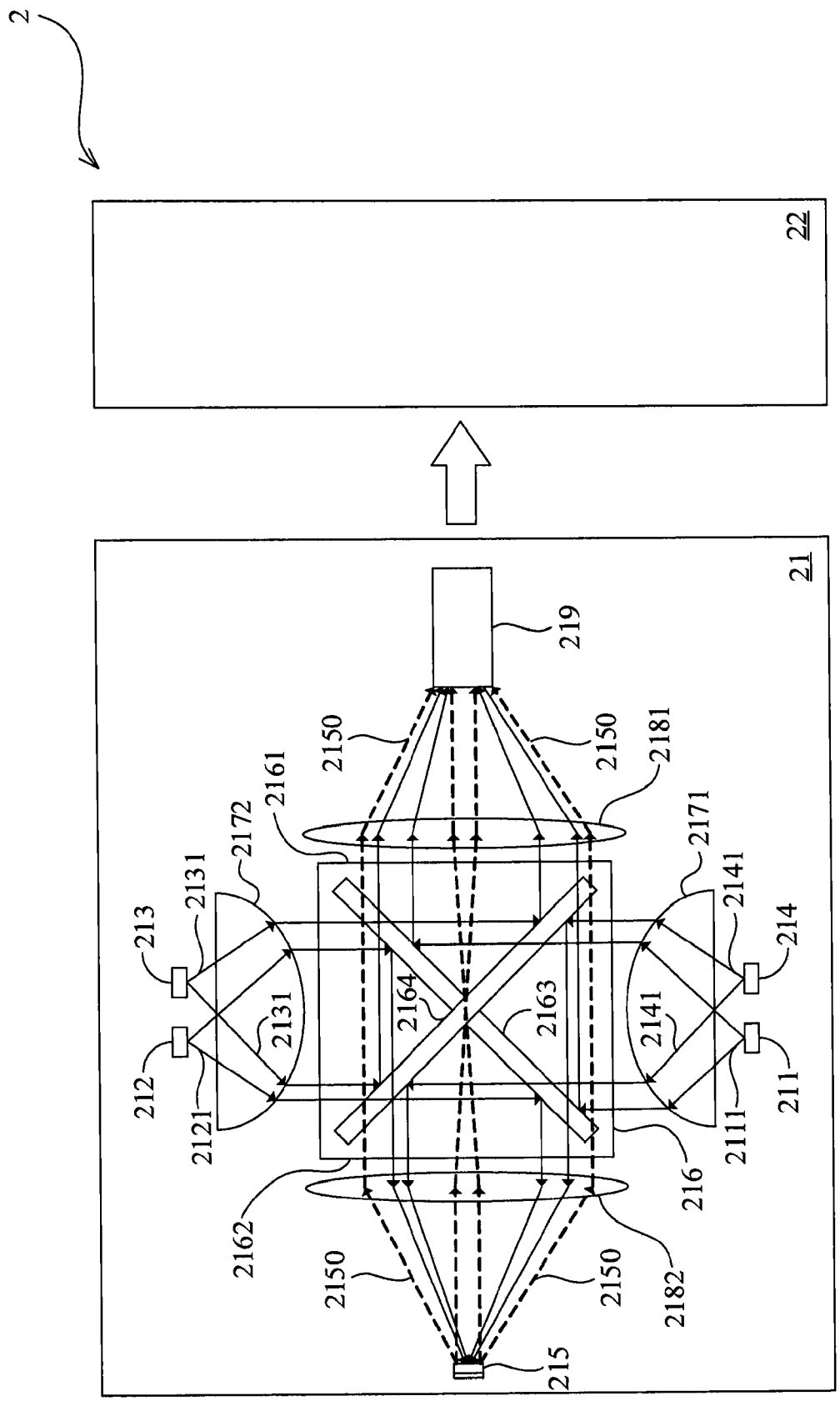
FIG. 2 is a schematic view of a projection apparatus of a second embodiment of the present invention.

As shown in FIG. 2, a second embodiment of the present invention is a projection apparatus 2, which comprises a light source system 21 and an imaging system 22. The light source system 21 of the projection apparatus 2 is adapted to generate light and output the light to the imaging system 22 so that the imaging system 22 displays an image to the screen.

The light source system 21 comprises a light emitting module consisting of a plurality of light sources 211, 212, 213, 214, a wavelength conversion element 215, a light guide module 216, a plurality of first lenses 2171, 2172, a plurality of second lenses 2181, 2182, and a light homogenizer module 219. For purpose of simplicity, the light sources 211, 212, 213, 214 will be referred to as first light source 211, second light source 212, third light source 213 and fourth light source 214 respectively. The light guide module 216 has a first side 2161 and a second side 2162, and comprises a first dichroic element 2163 and a second dichroic element 2164.

In this embodiment, the first light source 211 and the second light source 212, each being a blue LED, are adapted to generate a first light 2111 of blue color and a second light 2121 of blue color, respectively; the third light source 213, being a red LED, is adapted to generate a third light 2131 of red color; and the fourth light source 214, being an UV LED, is adapted to generate a fourth light 2141 which is UV light. The first dichroic element 2163 and the second dichroic element 2164 are arranged in form of an X-plate. The wavelength conversion element 215 has a conversion substance, which is a green phosphor, disposed thereon. The light homogenizer module 219 may be either an integrating rod or a lens array assembly.

It shall be particularly noted herein that, the light homogenizer module 219 and the imaging system 22 are substantially disposed beside the first side 2161 of the light guide module 216, and the wavelength conversion element 215 is substantially disposed beside the second side 2162 of the light guide module 216. However, the the light homogenizer module 219 of the present invention is not limited to an integrating rod or a lens array assembly. Those of ordinary skill in the art may also employ any other element with a light homogenizing function after the light source to output the emitted light, and thus no further description will be made thereon.

Further, in this embodiment, the first dichroic element 2163 is adapted to reflect blue light, and the second dichroic element 2164 is adapted to reflect UV light and red light. Accordingly, upon being concentrated to the first dichroic element 2163 via the first lens 2171, the first light 2111 which is the blue light will be reflected to the first side 2161 of the light guide module 216 directly and concentrated to the light homogenizer module 219 via the second lens 2181 so as to be projected to the imaging system 22. It shall be particularly noted herein that, in the process of being reflected to the second side 2162 of the light guide module 216, the first light 2111 of the blue light will pass through the second dichroic element 2164; however, the second dichroic element 2164 is adapted to reflect the UV light and the red light but transmit the blue light. Therefore, the first light 2111 which is the blue light can pass through the second dichroic element 2164 directly and be concentrated to the wavelength conversion element 215 via the second lens 2182.

Similarly, upon being concentrated to the second dichroic element 2164 via the first lens 2172, the third light 2131 which is the red light will be reflected to the first side 2161 of the light guide module 216 directly and concentrated to the light homogenizer module 219 via the second lens 2181 so as to be projected to the imaging system 22. It shall be particularly noted herein that, in the process of being reflected to the first side 2161 of the light guide module 216, the third light 2131 of the red light will pass through the first dichroic element 2163; however, the first dichroic element 2163 is adapted to reflect the blue light but transmit the red light. Therefore, the third light 2131 of the red light can pass through the first dichroic element 2163 directly and be concentrated to the light homogenizer module 219 via the second lens 2181.

In a principle similar as described above, upon being concentrated to the first dichroic element 2163 via the first lens 2172, the second light 2121 which is the blue light will be reflected to the second side 2162 of the light guide module 216 directly and concentrated to the wavelength conversion element 215 via the second lens 2182. It shall be particularly noted herein that, in the process of being reflected to the second side 2162 of the light guide module 216, the second light 2121 which is the blue light will pass through the second dichroic element 2164; however, the second dichroic element 2164 is adapted to reflect the UV light and the red light but transmit the blue light. Therefore, the second light 2121 which is the blue light can pass through the second dichroic element 2164 directly and be concentrated to the wavelength conversion element 215 via the second lens 2182.

Similarly, upon being concentrated to the second dichroic element 2164 via the first lens 2171, the fourth light 2141 which is the UV light will be reflected to the second side 2162 of the light guide module 216 directly and concentrated to the wavelength conversion element 215 via the second lens 2182. It shall be particularly noted herein that, in the process of being reflected to the first side 2161 of the light guide module 216, the fourth light 2141 of the UV light will pass through the first dichroic element 2163; however, the first dichroic element 2163 is adapted to reflect the blue light but transmit the UV light. Therefore, the fourth light 2141 which is the UV light can pass through the first dichroic element 2163 directly and be concentrated to the light homogenizer module 219 via the second lens 2181.

Upon receiving the second light 2121 which is the blue light and the fourth light 2141 which is the UV light, the wavelength conversion element 215 will convert the second light 2121 and the fourth light 2141 into the fifth light 2150 which is the green light through the conversion substance. Then, the fifth light 2150 which is the green light, generated by the wavelength conversion element 215, will be concentrated to the light homogenizer module 219 via the second lenses 2181, 2182 and the light guide module 216. It shall be particularly noted herein that, in the process of being concentrated to the light homogenizer module 219 via the light guide module 216, the fifth light 2150 of the green light will pass through the first dichroic element 2163 and the second dichroic element 2164; however, the first dichroic element 2163 is adapted to reflect the blue light but transmit the green light, and the second dichroic element 2164 is adapted to reflect the UV light and the red light but transmit the green light either. Therefore, the fifth light 2150 which is the green light can directly pass through the first dichroic element 2163 and the second dichroic element 2164 in a direction towards the first side 2161 of the light guide module 216, and then be concentrated to the light homogenizer module 219 via the second lens 2181.

Finally, the light homogenizer module 219 outputs to the imaging system 22 the first light 2111 which is the blue light, the third light 2131 which is the red light and the fifth light 2150 which is the green light so that the imaging system 22 displays an image with the first light 2111, the third light 2131 and the fifth light 2150.

According to the above descriptions, the light source system of the present invention, with a minimized volume, can use a blue LED, a red LED and a wavelength conversion element having a green phosphorus substance to replace the way of using UHP lamp and color wheel; thereby, the intensity of the light sources can be effectively improved. Furthermore, the light source system of the present invention utilizes the UV LED, the blue LED and the wavelength conversion element having the green phosphorus substance to replace the direct green LED for generating the green light with an improved intensity; thereby, the problem of the low green light emitting efficiency suffered by conventional LED light source systems using the direct green LEDs can be solved. Thus, with the light source system of the present invention, the problems with the conventional projection apparatuses can be improved significantly.

The above disclosure is related to the detailed technical contents and inventive features thereof. People skilled in this field may proceed with a variety of modifications and replacements based on the disclosures and suggestions of the invention as described without departing from the characteristics thereof. Nevertheless, although such modifications and replacements are not nifty disclosed in the above descriptions, they have substantially been covered in the following claims as appended.

What is claimed is:

1. A light source system, comprising:
    a light guide module, having a first side and a second side;
    a light emitting module, being adapted to generate a first light, a second light, a third light and a fourth light, wherein each of the first light and the second light is a blue light, the third light is a red light, and the fourth light is an ultraviolet (UV) light;
    a wavelength conversion element disposed beside the second side of the light guide module, comprising:
    a conversion substance, being adapted to receive the second light and the fourth light and convert the second light and the fourth light into a fifth light which is a green light and
    the light guide module further comprising:
    a first dichroic element, being adapted to guide the first light to the first side and guide the second light to the wavelength conversion element; and
    a second dichroic element, being adapted to guide the third light to the first side and guide the fourth light to the wavelength conversion element;
    wherein the fifth light is guided to the first side via the first dichroic element and the second dichroic element.

2. The light source system as claimed in claim 1, wherein the first dichroic element and the second dichroic element are arranged in series.

3. The light source system as claimed in claim 1, wherein the first dichroic element and the second dichroic element are arranged in form of an X-plate.

4. The light source system as claimed in claim 1, wherein the light emitting module further comprises:
    a first blue light emitting unit, being adapted to generate the blue light;
    a second blue light emitting unit, being adapted to generate the blue light;
    a red light emitting unit, being adapted to generate the red light; and
    an UV light emitting unit, being adapted to generate the UV light.

5. The light source system as claimed in claim 4, wherein the first dichroic element is adapted to reflect the blue light but transmit lights of other colors, and the second dichroic element is adapted to reflect the UV light and the red light but transmit lights of other colors.

6. The light source system as claimed in claim 1, further comprising a light homogenizer module disposed beside the first side of the light guide module.

7. The light source system as claimed in claim 6, wherein the light homogenizer module is either an integrating rod or a lens array assembly.

8. A projection apparatus, comprising: an imaging system; and a light source system, comprising:
    a light guide module, having a first side and a second side, wherein the imaging system is disposed beside the first side of the light guide module;
    a light emitting module, being adapted to generate a first light, a second light, a third light and a fourth light, wherein each of the first light and the second light is a blue light, the third light is a red light, and the fourth light is an UV light;
    a wavelength conversion element disposed beside the second side of the light guide module, comprising a conversion substance being adapted to convert the blue light and the UV light into the fifth light, wherein the fifth light is a green fight and
    the light guide module further comprising:
    a first dichroic element, being adapted to guide the first light to the imaging system and guide the second light to the wavelength conversion element; and
    a second dichroic element, being adapted to guide the third light to the imaging system and guide the fourth light to the wavelength conversion element;
    wherein the fifth light is guided to the imaging system via the first dichroic element and the second dichroic element.

9. The projection apparatus as claimed in claim 8, wherein the first dichroic element and the second dichroic element are arranged in series.

10. The projection apparatus as claimed in claim 8, wherein the first dichroic element and the second dichroic element are arranged in form of an X-plate.

11. The projection apparatus as claimed in claim 8, wherein the light emitting module of the light source system further comprises:
    a first blue light emitting unit, being adapted to generate the blue light;
    a second blue light emitting unit, being adapted to generate the blue light;
    a red light emitting unit, being adapted to generate the red light; and
    an UV light emitting unit, being adapted to generate the UV light.

12. The projection apparatus as claimed in claim 11, wherein the first dichroic element is adapted to reflect the blue light but transmit lights of other colors, and the second dichroic element is adapted to reflect the UV light and the red light but transmit lights of other colors.

13. The projection apparatus as claimed in claim 8, wherein the conversion substance is a green phosphor.

* * * * *